B. W. MILLER.
SECTIONAL WHEEL RIM.
APPLICATION FILED SEPT. 27, 1912.
1,107,092.
Patented Aug. 11, 1914.
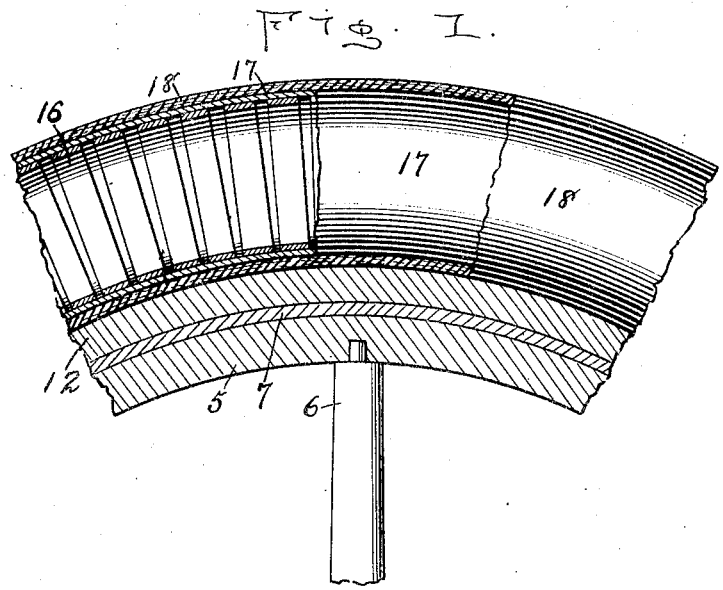
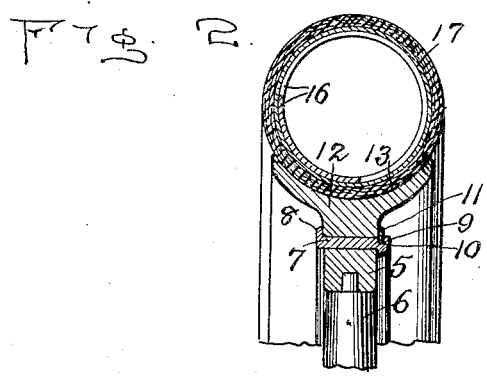
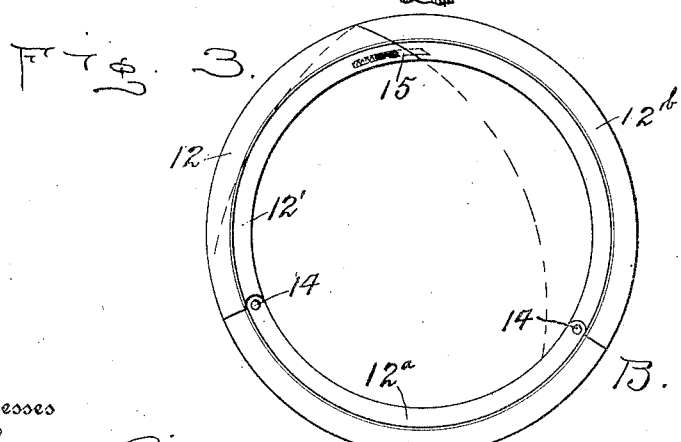
Witnesses
Thos. W. Riley
M. Newcomb
Inventor
B. W. Miller
By W. J. Fitzgerald
Attorneys.

UNITED STATES PATENT OFFICE.

BERT W. MILLER, OF ARTESIAN, SOUTH DAKOTA.

SECTIONAL WHEEL-RIM.

1,107,092.   Specification of Letters Patent.   Patented Aug. 11, 1914.

Application filed September 27, 1912. Serial No. 722,655.

*To all whom it may concern:*

Be it known that I, BERT W. MILLER, a citizen of the United States, residing at Artesian, in the county of Sanborn and State of South Dakota, have invented certain new and useful Improvements in Sectional Wheel-Rims; and I do hereby declare the following to be a full, clear, and exact description of the invention, such as will enable others skilled in the art to which it appertains to make and use the same.

This invention relates to wheel rims and tires, and it more particularly relates to a sectional wheel rim.

An object of the invention is to provide a wheel rim which is adapted to be collapsed in order that certain forms of non-stretchable tires may be quickly and easily applied thereto.

The object and advantages of the invention will be hereinafter more particularly set forth and then defined in the appended claim.

In the accompanying drawings which form a part of this application, Figure 1 is a fragmental sectional view through my improved wheel rim and tire. Fig. 2 is a fragmental detail view taken on a plane at right angles to the plane on which Fig. 1 is taken, and, Fig. 3 is a side elevation view of the pivotally united outer rim member.

Referring to the drawings in which similar reference characters designate corresponding parts throughout the several views, the numeral 5 designates a solid rim member which is connected with a spoke 6, in an ordinary manner. Secured upon the periphery of the rim 5 is a metal band or outer rim support 7 having a flange 8 formed on one edge and a flange 9 formed at its opposite edge, a circumferential groove 10 being provided between the flange 9 and the body of the band 7. The outer periphery of the flange 9 is flush with the outer periphery of the body of the band 7. A flat securing ring 11 is seated in the groove 10, said flat ring being normally secured within the groove by any proper means (not shown). The periphery of the band 7, between the flange 8 and the ring 11 forms a seat for the outer rim 12. This outer rim may be of any required or desired shape, in cross section, according to the size and shape of the tire to be fitted thereon; but, in the present instance, I preferably employ a rim of such shape that a tire of circular cross section would fit snugly within the tire seat 13, while the inner periphery of this rim is of such size and shape as to fit snugly upon the rim seat between the flange 8 and ring 11.

I preferably form the outer rim 12 of three arcuate sections 12′, 12ª and 12ᵇ, pivoted together at 14 and adapted to be locked together by means of a slide bolt indicated at 15. The non-pivoted ends of the sections 12′ and 12ᵇ are joined together on a plane at an angle to the radius of the rim, so that when the bolt 15 is disengaged from the section 12ᵇ, the section 12′ can be swung inward, in the direction of the section 12ª, while the section 12ᵇ may be swung inward over the section 12′, as indicated by the broken lines. It is readily seen that, when thus collapsed, this ring may be inserted within a tire of proper size, whereupon it may be expanded within the tire, so as to seat the latter in the tire seat 13, and the bolt 15 may then be brought into action for securing the rim in its expanded position. Having thus been secured, the rim 12 may be easily fitted onto the band 7 and secured thereon by inserting the ring 11 in the groove 10, any proper auxiliary securing means (not shown) being employed for preventing the rim 12 from rotating upon the band 7.

In constructing a tire of the character shown, I preferably employ a long strip of spring metal wound into a helical coil, as designated by the numeral 16, around this coil 16 is placed a strip of heavy canvas or duck 17 which extends parallel with the axis of the helical coil. An outer covering of rubber or rubber composition 18 is placed over the canvas, so that a tire of considerable resiliency and durability is obtained. Moreover, the tire of this character is practically non-stretchable, and hence, it would be difficult to force it upon an ordinary solid rim. It will be seen, however, that with my improved collapsible and demountable outer rim, the tire may be quickly and easily removed and replaced when necessary.

It will be seen that I have provided a combination of parts which is fully capable of attaining the foregoing objects, and in a thoroughly practical and efficient manner.

I do not limit my invention to the exact details of construction, combination and arrangement of parts as herewith described and illustrated, but my invention may only be limited by a reasonable interpretation of the claim.

I claim:

A demountable rim comprising an intermediate section, a pair of sections pivotally connected to the ends thereof, the whole constituting a complete rim, the non-pivoted ends of two adjacent sections being formed at an angle to the radius of the rim, the end of one of said sections being provided with a recess, a bolt located in a recess in the end of the adjacent section, a spring adapted to force said bolt into the recess of the other section, the pivoted sections being movable inward one over the other and expansible within a tire, said bolt serving to automatically lock the sections in extended annular form, said bolt being concealed within its section and disposed diametrically opposite the intermediate section.

In testimony whereof I have signed my name to this specification in the presence of two subscribing witnesses.

BERT W. MILLER.

Witnesses:
J. M. WITZEL,
JOHN MILLER.

Copies of this patent may be obtained for five cents each, by addressing the "Commissioner of Patents, Washington, D. C."